United States Patent

Raithel et al.

[15] 3,636,419

[45] Jan. 18, 1972

[54] PRESSURE-BIASED SEMICONDUCTOR COMPONENT FREE FROM DAMAGE TO SEMICONDUCTOR BODY

[72] Inventors: Kurt Raithel, Uttenreuth; René Rosenheinrich, Ebermannstadt, both of Germany

[73] Assignee: Siemens Aktiengesellschaft, Berlin, Germany

[22] Filed: Sept. 10, 1969

[21] Appl. No.: 856,702

[30] Foreign Application Priority Data

July 11, 1969 Germany ........................P 19 35 226.2
July 11, 1969 Germany ........................P 19 35 227.3

[52] U.S. Cl. ....................317/234 R, 317/234 G, 317/234 L, 317/234 N, 317/234 P, 317/235 AB, 317/235 R

[51] Int. Cl. ........................................................H01l 1/14

[58] Field of Search...............317/234, 234 P, 234 L, 234 N; 75/134, 134 B, 134 T

[56] References Cited

UNITED STATES PATENTS

| | | | |
|---|---|---|---|
| 3,221,219 | 11/1965 | Emeis et al. | 317/234 |
| 3,238,425 | 3/1966 | Geyer | 317/234 |
| 3,299,328 | 1/1967 | Martin et al. | 317/234 |
| 3,423,649 | 1/1969 | Herlet | 317/234 |
| 3,476,986 | 11/1969 | Tsuji | 317/234 |

FOREIGN PATENTS OR APPLICATIONS

| | | | |
|---|---|---|---|
| 1,435,777 | 3/1966 | France | 317/234 P |
| 1,507,779 | 11/1967 | France | 317/234 P |
| 1,237,695 | 3/1967 | Germany | 317/234 P |
| 420,388 | 3/1967 | Switzerland | 317/234 L |
| 1,154,762 | 6/1969 | United Kingdom | 317/234 P |

OTHER PUBLICATIONS

Chemical Rubber Company, pub., Handbook of Chemistry and Physics, 46 th Ed. (1965), pp. D88, F15, F- 106, F- 107; tables on Hardness, Resistivity, and Melting Point.

*Primary Examiner*—John W. Huckert
*Assistant Examiner*—William D. Larkins
*Attorney*—Curt M. Avery, Arthur E. Wilfond, Herbert L. Lerner and Daniel J. Tick

[57] ABSTRACT

A wafer-shaped semiconductor body is sandwiched between contact electrodes. A foil of ductile metal bears against each contact electrode. The foils are congruent and have contours which are substantially coincidental and which are substantially in overlapping alignment. A contact member bears against each foil and is urged against each surface of the semiconductor via the corresponding foil and the corresponding contact electrode to form glidable pressure contacts.

3 Claims, 11 Drawing Figures

PRESSURE-BIASED SEMICONDUCTOR COMPONENT FREE FROM DAMAGE TO SEMICONDUCTOR BODY

DESCRIPTION OF THE INVENTION

The present invention relates to a pressure-biased semiconductor component. More particularly, our invention relates to a pressure-biased semiconductor component which is free from damage to the semiconductor body.

A semiconductor component described in U.S. Pat. No. 3,349,296 has a housing wherein a wafer-shaped semiconductor body is contacted and held by a solder-free pressure contact. The wafer-shaped semiconductor body has contact electrodes on its substantially planar spaced opposite surfaces. The contact electrodes comprise vapor-deposited thin metal coats or layers. Within the housing, the semiconductor body is positioned between the contact surfaces of two pressure members, one of which comprises the bottom of the housing and the other of which comprises a pressure-biased current lead. A foil or electroplated layer of ductile metal such as, for example, silver, is positioned between the contact surfaces of the pressure members and the contact electrodes. The silver foil permits the pressure members to glide or slide sideways along the contact electrodes of the semiconductor body. This prevents different thermal expansion of the pressure members and of the semiconductor body from having an adverse effect on the semiconductor body due to temperature changes occurring during operation. The contact surfaces of the pressure members are pressed against the planar surfaces of the semiconductor body via the foils and the contact electrodes of the semiconductor body with a pressure per unit area in the order of magnitude of 50 kg./cm.$^2$.

The known semiconductor component has a particular advantage for power components due to the fact that large area contact electrodes may be contacted perfectly at the surfaces of the semiconductor body. Moreover, the known semiconductor component is particularly preferred, since no special carrier body comprised of a metal, which is specially adjusted to the semiconductor with respect to the coefficient of heat expansion, is affixed to the semiconductor body. As a result, the heat produced by losses in the semiconductor body may be directly removed from the semiconductor body via the bottom of the housing. This process is not hampered by the heat resistance of a carrier body, located between the housing and the semiconductor body.

In the known semiconductor component, the semiconductor body extends radially beyond the contact surface of the pressure-biased current lead or pressure member and it also extends radially beyond the layer or coat of silver plating positioned between said contact surface and the contact electrode of the semiconductor body. The semiconductor body is positioned on the surface of the bottom pressure member, with the second silver foil positioned between the contact surface of said pressure member and the corresponding contact electrode of said semiconductor body.

The semiconductor body is a thin wafer-shaped body. Such a semiconductor body, which is not supported by a carrier body or component, and which is held by a glidable or slidable solder-free pressure contact, is occasionally subjected or vulnerable to damage during operation. Such damage is in the form of tears, faults or separations. This is especially true in semiconductor bodies having contact electrodes which are alloyed in, as well as semiconductor bodies having a plurality of large area contact electrodes on their surfaces such as, for example, bilateral thyristors. The aforedescribed damage also occurs in semiconductor bodies having a bevelled edge. When the separations, tears or faults occur at PN-junctions, the previously perfect characteristic curve of the semiconductor component becomes impaired after the component is in operation for a period of time. This results in the semiconductor component becoming essentially useless.

The principal object of our invention is to provide a new and improved pressure-biased semiconductor component.

An object of the invention is to provide a pressure-biased semiconductor component which is free from damage to the semiconductor body.

An object of the invention is to provide a pressure-biased semiconductor component which overcomes the disadvantages of known similar components.

An object of our invention is to provide a pressure-biased semiconductor component which functions with efficiency, effectiveness and reliability.

In accordance with the present invention, a semiconductor component comprises a wafer-shaped semiconductor body having substantially planar spaced opposite surfaces. There is at least one contact electrode of each surface of the semiconductor body in the housing. Each of a pair of foils of ductile metal bears against a contact electrode on a corresponding one of the surfaces of the semiconductor body. The foils are congruent and have contours which are substantially coincidental and which are substantial in overlapping alignment. Each of a pair of contact members bears against a corresponding one of the foils and is urged against a corresponding one of the surfaces of the semiconductor body via a corresponding one of the foils of ductile metal and a corresponding one of the contact electrodes thereby forming glidable pressure contacts.

In one embodiment, one of the foils is graduated in a downward manner from the corresponding one of the contact members to the corresponding one of the contact electrodes.

In another embodiment, the semiconductor body extends radially beyond the foils.

In another embodiment, the surfaces of the contact members abutting the foils extend radially beyond such foils.

In another embodiment, the foils and the surfaces of the contact members abutting the foils extend radially equally with the semiconductor body and form a common peripheral area therewith.

The foils may comprise a metal of the group consisting of aluminum, silver and an alloy containing at least one of cadmium, indium and lead, or an alloy of indium, lead and silver, or a metal of the group consisting of cadmium, indium and lead.

In accordance with the present invention, the contour of each foil abutting against a surface of the semiconductor body and against the contact surface of the corresponding pressure member is substantially congruent with the contour of the other and said foils substantially overlap each other. Preferably, the contours of the foils abutting both surfaces of the semiconductor body and the contact surfaces of the pressure members are congruent and in overlapping alignment.

The structure of the semiconductor component of our invention results in a semiconductor body which is free from deformation areas, so that there is no damage produced anywhere in said semiconductor body which may lead to disturbances in the characteristic curve of the semiconductor component.

In order that the invention may be readily carried into effect, it will now be described with reference to the accompanying drawings, wherein.

Figure 3A:
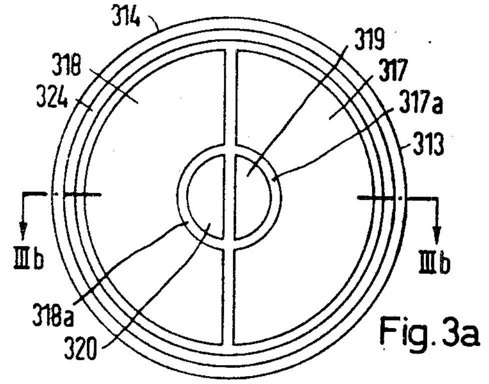
Figure 3B:
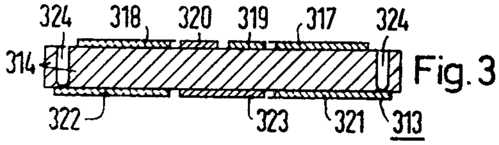
Figure 2:
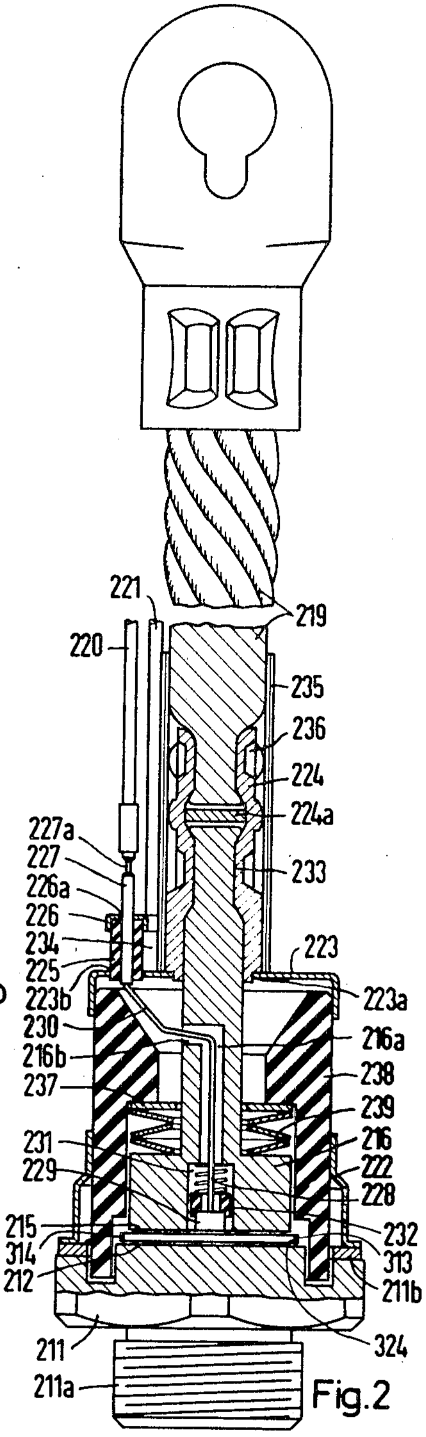
FIG. 2 is a view, partly in section, of an embodiment of a semiconductor component of the invention.
Figure 2A:
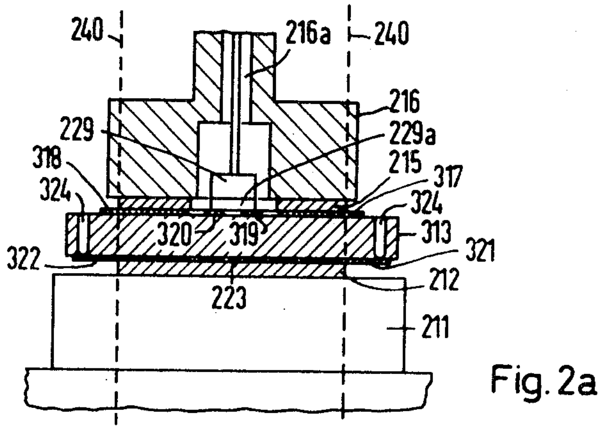

FIG. 2*a* is a view, partly in section, of the pressure contacts of an embodiment of the semiconductor component of the invention;

FIG. 3*a* is a top schematic view of the semiconductor body of the semiconductor component of FIG. 2;

FIG. 3*b* is a sectional view taken along the lines III*b*—III*b* of FIG. 3*a;*

Figure 3C:
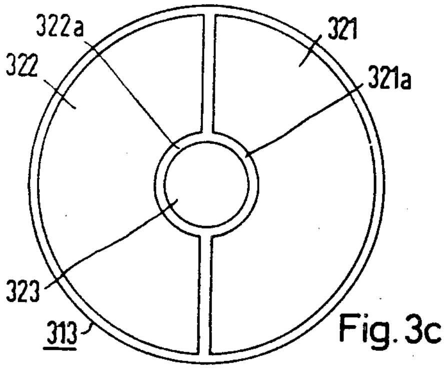
Figure 6:
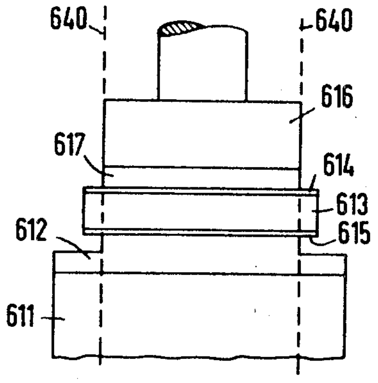
Figure 7:
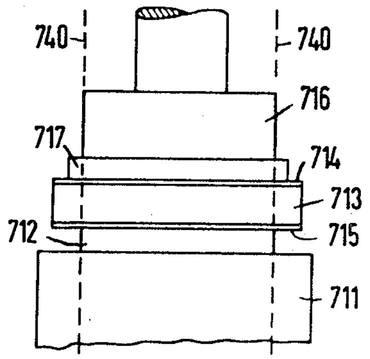
Figure 8:
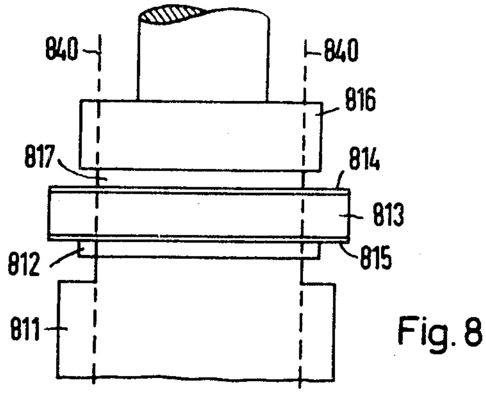
Figure 4:
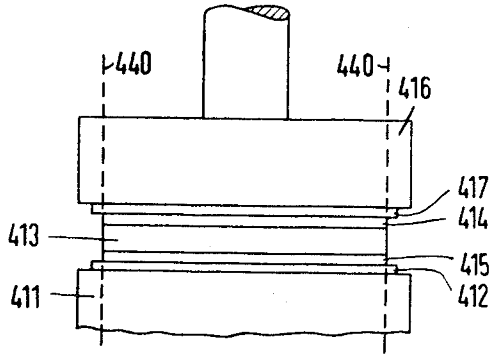
Figure 5:
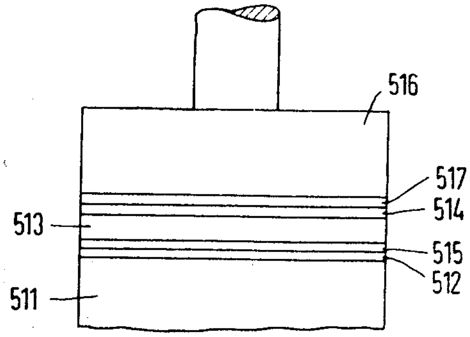

FIG. 3*c* is a bottom schematic view of the semiconductor body of the semiconductor component of FIG. 2;

FIG. 4 is a schematic diagram of another embodiment of the pressure contacts of the semiconductor component of our invention;

FIG. 5 is a schematic diagram of another embodiment of the pressure contacts of the semiconductor component of the invention;

FIG. 6 is a schematic diagram of another embodiment of the pressure contacts of the semiconductor component of our invention;

FIG. 7 is a schematic diagram of another embodiment of the pressure contacts of the semiconductor component of our invention; and FIG. 8 is a schematic diagram of still another embodiment of the pressure contacts of the semiconductor component of the invention.

Figure 1:
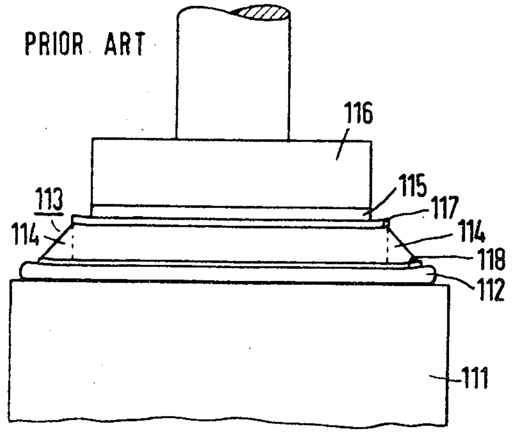
FIG. 1 is a schematic diagram of the pressure contacts of a wafer-shaped semiconductor body of a semiconductor component of known structure.

In FIG. 1, a wafer-shaped semiconductor body 113, without a carrier body, is positioned between a pressure member 116 and a base member 111 which constitutes the bottom of the housing (not shown in FIG. 1). The semiconductor body 113 has a bevelled periphery and a large area contact electrode 117 alloyed in at one of its planar surfaces and a large area contact electrode 118 alloyed in at its spaced opposite planar surface. The pressure member 116 is urged or pressed against the base member 111 via suitable springs, which are not shown in FIG. 1.

A foil 115 comprising a ductile metal, such as, for example, silver, is provided between the contact surface of the pressure member 116 and the contact electrode 117 of the semiconductor body 113. Instead of the foil 115, the contact surface of the pressure member 116 may be covered with a silver layer or coat. A foil 112 of ductile metal, such as, for example, silver, is positioned between the surface contact of the base member 111 and the contact electrode 118 of the semiconductor body 113. Each of the foil 115 and the contact surface of the pressure member 116 extends radially for a shorter distance than the corresponding surface of the semiconductor body 113. Each of the foil 112 and the contact surface of the base member 111 extends radially a greater distance than the corresponding surface of the semiconductor body 113, and in fact extends radially beyond the annular peripheral portion 114 of the semiconductor body 113.

During operation of the semiconductor component of which the pressure contacts of FIG. 1 are a part, the metal of the foil 112 is partly urged or pressed radially outward due to pressure exerted upon it by the pressure member 116 and the base member 111. The produced and dissipated heat promotes or furthers the pressing process. It is assumed that a specific accumulation of the metal of the foil 112 occurs beneath the annular peripheral portion 114 of the semiconductor body 113 and results in a thickening of said foil which causes bending of said annular peripheral portion. The resultant bending of the annular peripheral portion 14 is shown grossly exaggerated in FIG. 1.

Apparently, tears, separations, or the like occur in the semiconductor body 113 particularly when the contact electrodes 117 and 118 are alloyed in or when a plurality of large area contact electrodes are positioned on a planar surface of the semiconductor body. Semiconductor bodies having a planar surface with a channel, groove or recess formed therein and extending parallel or concentric with the outer edge thereof, or having a bevelled peripheral surface, of the type shown in FIG. 1, are especially vulnerable to this type of damage. In the semiconductor component of FIG. 2, which is in accordance with our invention, the wafer-shaped semiconductor body is free from deformation. The housing of the semiconductor component of FIG. 2 comprises a base member 211. The base member 211 comprises copper and is provided with an extending coaxial portion 211*a* having external threading. An annular iron member 211*b* is affixed to the upper surface of the base member 211 by any suitable means, such as, for example, hard solder. A hollow cylinder 238 of ceramic is affixed to the upper surface of the base member 211 with the assistance of a flange 222.

The flange 222 comprises Vacon, which is an iron-cobalt-nickel alloy having a coefficient of heat expansion which is adjusted to that of the ceramic material of the cylinder 238. The composition of Vacon, which is also known as Fernico, is about 56 percent iron, 22 percent nickel and 22 percent cobalt. The flange 222 is affixed by any suitable means such as, for example, hard solder, to the outer cylindrical surface of the ceramic member 238 and is welded to the iron annular member 211*b*. A cap 223, which also comprises Vacon is affixed by any suitable means such as, for example, hard solder, to the hollow cylinder 238 at its upper open base.

The contact surface of the base member 211, is substantially planar. A foil 212 of ductile metal is positioned on the contact surface of the base member 211, between said contact surface and the lower planar surface of the semiconductor body 313 as shown in FIG. 2*a*. A foil 215 of ductile material is positioned on the upper planar surface of the semiconductor body 313 between said semiconductor body and the contact surface of the pressure member 216. The ductile metal, of which the foils 212 and 215 are comprised, comprises soft or annealed silver or pure aluminum. The foil 212 has a thickness of from 40 to 60 microns, preferably 50 microns.

In order to compensate for slight roughness of the contact surfaces of the pressure member 216 and the base member 211, the foils 212 and 215 comprise a pliant, well-forming metal. It is thus expedient to provide a metal for the foil which has a maximum Brinell hardness of 30 kg./mm.$^2$, preferably 26 kg./mm.$^2$. The melting point of the foil metal should be at least 135° C. and is preferably at least 250° C. Such a foil will not melt even when the semiconductor component is subjected to impact or shock. Metals which satisfy these requirements are pure aluminum, soft or annealed silver, alloys of cadmium, indium or lead, and alloys comprising at least one of cadmium, indium or lead.

The foils 212 and 215 preferably comprise an indium-lead-silver alloy having a melting point of 280° to 285° C. and a Brinell hardness of approximately 9.9 kg./mm.$^2$. Particularly suitable foil materials are an alloy of 5 percent indium, 92.5 percent lead and 2.5 percent silver, by weight, an alloy of 90 percent indium and 10 percent silver, by weight, an alloy of 25 percent indium, 37.5 percent lead and 37.5 percent tin, by weight, an alloy 50 percent indium and 50 percent lead, by weight, and an alloy of 25 percent indium and 75 percent lead, by weight.

In the embodiment of FIGS. 2, 2*a*, 3*a*, 3*b* and 3*c*, the semiconductor component comprises a bilateral thyristor or Triac, as described on pages 9, 14, 330 and 393 of the SCR Manual, Fourth Edition, General Electric Company, Semiconductor Products Department, 1967. FIGS. 3*a*, 3*b* and 3*c* illustrate a Triac. FIG. 3*a* is a view of the upper planar surface of the semiconductor body 313 of FIG. 2*a* and FIG. 3*c* is a view of the lower planar surface of said semiconductor body. FIG. 3*b* is a diametrical section of the semiconductor body 313 of FIG. 2*a*.

Two oppositely poled thyristors are combined in the semiconductor body 313. The semiconductor body 313 has a thickness in the range of 200 to 400 microns, preferably 300 microns. One of the thyristors has a main contact electrode 318 on its upper surface, a main contact electrode 322 on its lower surface and a control contact 320 on its upper surface. The other of the thyristors has a main contact electrode 317 on its upper surface, a main contact electrode 321 on its lower surface and a control contact 319 on its upper surface. The control contacts 319 and 320 are positioned in a recess which comprises partial recesses 317*a* and 318*a* formed at the axial center of the unit between the main contact electrodes 317 and 318. The lower surface has an additional contact electrode 323 positioned within a recess which comprises partial recesses 321*a* and 322*a* formed at the axial center of the unit between the main contact electrodes 321 and 322. The electrodes 317, 318, 319, 320, 321, 322 and 323 are alloy electrodes.

The main contact electrodes 321 and 322 on the lower surface of the semiconductor body 313 extend radially almost to the edge or periphery of said semiconductor body, whereas the main contact electrodes 317 and 318 on the upper surface of said semiconductor body extend for a shorter radial distance. A channel, recess, groove, or the like, 324 is formed in the upper surface of the semiconductor body 313 between the main contact electrodes 317 and 318 and the periphery of said semiconductor body. The channel 324 is filled with insulating silicon varnish in order to protect the PN-junctions in said semiconductor body. The channel 324 extends to the lower surface of the semiconductor body at the main contact electrodes 321 and 322.

In the housing of FIG. 2, as shown in FIGS. 3*a* to 3*c*, the main contact electrode 317 is electrically connected to the main contact electrode 318, the main contact electrode 321 is electrically connected to the main contact electrode 322 and to the contact electrode 323, and the control contact 319 is electrically connected to the control contact 320.

An annular disc-shaped foil 215, as hereinbefore described, is provided on the upper surface of the semiconductor body 313, and rests on the main contact electrodes on said surface. The foil 215 has a thickness of 40 to 60 microns, preferably 50 microns. The substantially planar contact surface of the pressure member 216 abuts the foil 215 and is of annular configuration. The pressure member 216 is positioned within the hollow cylinder 238 and has an axial bore 216*a* (FIG. 2) formed therethrough and a radial bore 216*b* (FIG. 2) formed therein. The main contact electrodes 317, 318 and 321, 322 extend radially beyond the foils 212 and 215 (FIG. 2*a*).

The foil 215 is of annular configuration with a circular outer contour. The foil 212 is of circular configuration with a circular contour. As shown in FIG. 2*a*, the diameters of the foils 215 and 212 are equal, that is, the contours of both foils coincide. Furthermore, the foils 212 and 215 are exactly superimposed upon each other, as shown by the broken lines 240 in FIG. 2*a*, so that said foils are in overlapping alignment. In the embodiment of FIGS. 2, 2*a*, 3*a*, 3*b* and 3*c*, the substantially planar contact surfaces of the base member 211 and of the pressure member 216 extend radially beyond the foils 212 and 215.

Since both foils 212 and 215, and thus the outer contours of said foils which bear against the corresponding surfaces of the semiconductor body 313, coincide, the pressure exerted by the pressure member 216 cannot result in an accumulation of foil material at one side of said semiconductor body at the edge of said foils. Such an accumulation of foil material, which is avoided in our invention, could result in a bending of the semiconductor body 313, as hereinbefore described. Thus, even at a pressure of 90 to 120 kg./cm.$^2$, preferably 100 kg./cm.$^2$, which is originally utilized to urge or press the pressure member 216 against the base member 211, the semiconductor body 313 is free from deformation, so that no undesired damage in the form of tears, separations, or the like, may occur. This is also true when the outer diameter of each of the foils 212 and 215 coincides with the outer diameter of the contact surface of the pressure member 216 and when the outer contours of said foils coincide with said contact surface.

The object of the present invention is also attained, for example, when the foil 215 of FIGS. 2 and 2*a* extends radially beyond the semiconductor body 313 while the diameter of the foil 212 coincides with the outer diameter of the contact surface of the pressure member 216, that is, when the contours of said foil and said contact surface coincide and are in superimposed alignment.

The pressure member 216 comprises copper and simultaneously functions as a current lead for the two main contact electrodes on the upper surface of the semiconductor body 313. As shown in FIG. 2, a current lead 228 is provided in the axial bore 216*a* of the pressure member 216 and is insulated from said pressure member. The current lead 228 electrically contacts the control contacts on the upper surface of the semiconductor body 313. The current lead 228 has a small pressure portion or head 229 having a silver layer 229*a* at its contact surface bearing upon the control contacts. An insulated lead 230 extends from the current lead 228. The pressure member 229 is urged or pressed against a shoulder in the bore 216*a*. An insulating sleeve 232 of any suitable electrically insulating material such as, for example, Teflon or polytetrafluorethylene, is coaxially positioned between the spiral spring 231 and the pressure member 229 around the current lead 228.

The pressure member 216 is urged or pressed against the semiconductor body 313 by plate springs 239 (FIG. 2) which abut against a shoulder of the inner housing surface of the hollow cylinder 238. An annular disc 237 comprising steel is positioned between the shoulder and the plate springs 239 in order to protect the ceramic material of the cylinder 238 from damage by said plate springs.

A copper tube 224 is affixed within a central opening 223*a* of the cap 223 and has a radial end plate 224*a* in its inner area. The shank of the pressure member 216 extends into the inner chamber or area of the pipe 224 and is affixed to said pipe by pressure or crimping in an area 233. A ceramic tube 225 is affixed by hard solder to another opening 223*b* of the cap 223. The ceramic tube 225 is sealed by a cap 226 which is affixed to the open base thereof by any suitable means such as, for example, hard solder. The cap 226 comprises Vacon.

The cap 226 has an opening 226*a* formed therethrough to accommodate a lead through tube 227 comprising Vacon and hard soldered to said cap. The lead 230 of the current lead 238 is positioned and extends through the tube 227. The lead 230 is affixed to the lead through tube 227 by pressure, such as crimping, in an area 227*a*. The lead 230 is covered with a jacket of electrically insulating material. An electrically insulated control lead 220 is affixed to the tube 227. Another control lead 222 is affixed within a sleeve 224 comprising Vacon and is affixed to the cap 223 by hard solder in an area between the ceramic tube 225 and the copper tube 224. A housing 235 of electrical insulation is provided around the copper tube 224. An outer conductor or cable 219 is provided with a terminal lug, affixed thereto by pressure, such as crimping, in an area 236.

The embodiments of FIGS. 4 and 5 of the invention are particularly suitable for low-voltage rectifiers of high capacity. Each of the semiconductor bodies 413 of FIG. 4 and 513 of FIG. 5 includes a PN-junction. The semiconductor body 413 is provided at its upper planar surface with a large area contact electrode 414 and at its lower planar surface with a large area contact electrode 415. The semiconductor body 513 is provided at its upper surface with a large area contact electrode 514 and at its lower surface with a large area contact electrode 515. A foil 417 is provided between the pressure member 416 and the contact electrode 414, and a foil 412 is provided between the base member 411 and the contact electrode 415, in FIG. 4. In FIG. 5, a foil 517 is provided between the pressure member 516 and the contact electrode 514, and a foil 512 is provided between the base member 511 and the contact electrode 515. Each of the foils 417, 412, 517 and 512 comprises a ductile metal, as hereinbefore described.

In the embodiment of FIG. 4, deformations which would damage the semiconductor body 413 by tears, separations, or the like, are prevented by the radial extension of the contact surfaces of the base member 411 and the pressure member 416, and the radial extension of both foils 412 and 417 beyond the semiconductor body 413. Preferably, the contact surfaces of the pressure member 416 and the base member 411, and the foils 412 and 417 extend radially beyond the semiconductor body 413 by one-tenth to one-fifth its diameter. As indicated by the broken lines 440, the contours of the foils which are adjacent to both planar surfaces of the semiconductor body 413 and are adjacent the contact surfaces of the pressure member 416 and the base member 411, are congruent. Furthermore, the aforedescribed contours are in overlapping alignment.

In the embodiment of FIG. 5, deformations in the semiconductor body 513, which may damage said semiconductor body, are prevented by the contact surfaces of the pressure member 516 and of the base member 511, and both foils 512 and 517, coinciding with the contact electrodes 514 and 515 which cover the entire planar surfaces of said semiconductor body. The contact surfaces of the pressure member 516, the base member 511 and the foils 517 and 512 have a common peripheral area.

In the embodiments of FIGS. 6, 7 and 8, neither the contact surfaces of the pressure member and the base member nor the foils extend radially beyond the semiconductor body and neither the contact surfaces of the pressure member and the base member nor the foils coincide with the planar surfaces of the semiconductor body. On the contrary, the components are arranged in a manner whereby the semiconductor body extends radially beyond the foils and the contact surface of the pressure member and the contact surface of the base member. The embodiments of FIGS. 6, 7 and 8 are particularly suitable for high-voltage rectifiers. The insulating path between the rims of both foils is long, thereby preventing sparkovers in these embodiments. In order to prevent sparkovers, it is recommended that the semiconductor body be extended radially beyond both foils.

In FIGS. 6, 7 and 8, the semiconductor bodies 613, 713 and 813 each include an PN-junction in parallel with the planar surfaces thereof and each of said semiconductor bodies is provided with an alloyed large area metal electrode on each of its planar surfaces. The semiconductor body 613 of FIG. 6 has an alloyed large area metal contact electrode 614 on its upper surface and an alloyed large area metal electrode 615 on its lower surface. The semiconductor body 713 FIG. 7 has an alloyed large area metal electrode 714 on its upper surface and an alloyed large area metal contact electrode 715 on its lower surface. The semiconductor body 813 of FIG. 8 has an alloyed large area metal contact electrode 814 on its upper surface and an alloyed large area metal contact electrode 815 on its lower surface.

In FIG. 6, a disc-shaped foil 617 is positioned between the contact electrodes 614 and the contact surface of the pressure member 616 and a disc-shaped foil 612 is positioned between the contact electrode 615 and the base member 611. In FIG. 7, a disc-shaped foil 717 is positioned between the contact electrode 714 and the contact surface of the pressure member 716, and a disc-shaped foil 712 is positioned between the contact electrode 715 and the contact surface of the base member 711. In FIG. 8, a disc-shaped foil 817 is positioned between the contact electrode 814 and the contact surface of the pressure member 816, and a disc-shaped foil 812 is positioned between the contact electrode 815 and the contact surface of the base member 811. Each of the foils comprises a ductile metal such as, for example, soft or annealed silver, as hereinbefore described. The contact surface of each of the pressure members 616, 716 and 816 is of circular configuration.

In the embodiment of FIG. 6, the foil 612 is graduated or graded downward from the base member 611 toward the semiconductor body 613. The grading of the foil 612 facilitates, in some cases, the centering of said foil on the base member 611. The contour of the contact surface of the pressure member 616 coincides with the contour of the foil 617. As indicated by the broken lines 640, the contours of the foils 617 and 612 adjacent the planar surfaces of the semiconductor body 613, and at the contact surface of the pressure member 616, coincide. The contours of the components also overlap. The semiconductor body 613 is thus free of deformations which may produce tears, separations, or the like.

The broken lines 740 of FIG. 7 and 840 of FIG. 8 indicate the same conditions and results as the broken lines 640 of FIG. 6 indicate. In the embodiment of FIG. 7, the foil 716 extends radially beyond the contact surface of the pressure member 716. The contour of the foil 712 coincides, however, with the contour of the contact surface of the pressure member 716 and overlaps said contour.

In the embodiment of FIG. 8, the base member 11 is graduated or graded at its end adjacent the foil 812. The outer rim of the foil 812 does not bear against the contact surface of the base member 811. The semiconductor body 813 extends radially beyond the foil 812. The contact surface of the pressure member 816 extends radially beyond the foil 817 and said foil bears against said contact surface. The diameter of the foil 817 is equal to the inside diameter of the circular graduation of the contact surface of the base member 811, so that the semiconductor body 813 is free of deformations.

The semiconductor component of our invention is not limited to bilateral thyristors or rectifiers, but may be utilized with other components such as, for example, thyristors, providing the same advantages and results as in the illustrated examples.

While the invention has been described by means of specific examples and in specific embodiments, we do not wish to be limited thereto, for obvious modifications will occur to those skilled in the art without departing from the spirit and scope of the invention.

We claim:

1. A semiconductor component having a housing, a wafer-shaped semiconductor body in the housing having substantially planar spaced surfaces on opposite sides thereof each having at least one contact electrode, a pair of terminal contact members each having a contact surface positioned on opposite sides of the semiconductor body, a pair of metal foils one of which is positioned between one of the contact electrodes and the contact surface of one of the terminal contact members, said terminal contact members, said contact electrodes and said metal foils being positioned in coaxial relation with each other and being pressed against each other under pressure only, said foils comprising a ductile metal of the group consisting of aluminum, silver, an alloy of aluminum and silver, cadmium, indium, lead and an alloy of at least one of cadmium, indium and lead, each of the foils bearing directly against a corresponding one of the contact electrodes, the foils on both sides of the semiconductor body coinciding and the semiconductor body and the terminal contact members having a radius greater than that of the foils.

2. A semiconductor component as claimed in claim 1, wherein at least one of the foils has a surface facing the semiconductor body which has a radius smaller than that of the surface facing the terminal contact member.

3. A semiconductor component having a housing, a wafer-shaped semiconductor body in the housing having substantially planar spaced surfaces on opposite sides thereof each having at least one contact electrode, a pair of terminal contact members each having a contact surface positioned on opposite sides of the semiconductor body, a pair of metal foils one of which is positioned between one of the contact electrodes and the contact surface of one of the terminal contact members, said terminal contact members, said contact electrodes and said metal foils being positioned in coaxial relation with each other and being pressed against each other under pressure only, said foils comprising a ductile metal of the group consisting of aluminum, silver, an alloy of aluminum and silver, cadmium, indium, lead and an alloy of at least one of cadmium, indium, and lead, each of the foils bearing directly against a corresponding one of the contact electrodes, the portion of the foil contacting the contact electrode on one side of the semiconductor body coinciding with the contact surface of the terminal contact member on the other side of the semiconductor body, the semiconductor body having a radius greater than that of the foils, the foil on the other side of the semiconductor body having a radius at least as great as that of the foil on the one side of the semiconductor body, and at least one of the foils having a surface facing the semiconductor body which has a radius smaller than that of the surface facing the terminal contact member.

* * * * *